United States Patent [19]

Kanno et al.

[11] Patent Number: 5,077,812

[45] Date of Patent: Dec. 31, 1991

[54] IMAGE PROCESSING APPARATUS

[75] Inventors: Hiroki Kanno; Hitoshi Yoneda, both of Kanagawa, Japan

[73] Assignee: Kabushiki Kaisha Toshiba, Kanagawa, Japan

[21] Appl. No.: 572,403

[22] Filed: Aug. 27, 1990

[30] Foreign Application Priority Data

Aug. 30, 1989 [JP] Japan .................................. 1-223707
Aug. 30, 1989 [JP] Japan .................................. 1-223708

[51] Int. Cl.⁵ .............................................. G06R 9/38
[52] U.S. Cl. .................................... 382/50; 358/261.2; 358/466
[58] Field of Search ........................ 382/56, 54, 50, 52; 358/456, 443, 457, 465, 466, 429, 261.2; 341/51

[56] References Cited

U.S. PATENT DOCUMENTS

| | | | |
|---|---|---|---|
| 4,668,995 | 5/1987 | Chen et al. | 382/54 |
| 4,876,610 | 10/1989 | Ohsawa et al. | 358/443 |
| 4,955,065 | 9/1990 | Ulichney | 358/456 |
| 4,958,238 | 9/1990 | Katayama et al. | 358/456 |
| 4,975,786 | 12/1990 | Katayama et al. | 382/50 |

OTHER PUBLICATIONS

Floyd and Steinberg, An Adaptive Algorithm for Spatial Greyscale, Proceeding of the S.I.D., vol. 17/2, Second Quarter, 1976, pp. 75-77.

Primary Examiner—David K. Moore
Assistant Examiner—Joseph Mancuso
Attorney, Agent, or Firm—Finnegan, Henderson, Farabow, Garrett, and Dunner

[57] ABSTRACT

An image processing apparatus including an input circuit for receiving image data, a binarizing unit for binarizing a subject pixel of the image data supplied from the input circuit, an error detector for detecting an error between a binarized image data obtained by the binarizing unit and the image data supplied from the input circuit, an error diffusing circuit for diffusing the error on other image data associated with other pixels around the subject pixel, a compensating unit for compensating the image data of the subject pixel by using a compensation data which is caused by a previous error diffusion of the error diffusing circuit, a circuit for detecting an image density of the image data for a prescribed image area surrounding the subject pixel and a controller for controlling the compensating unit in response to the image density detected by the image density detecting circuit.

9 Claims, 4 Drawing Sheets

IMAGE PROCESSING APPARATUS

FIELD OF THE INVENTION

The present invention relates generally to an image processing apparatus, and more particularly, to an image processing apparatus for processing both a continuous-tone image and a two-tone image in a digital manner.

BACKGROUND OF THE INVENTION

Conventionally, various image processing apparatus for processing images in a digital manner have been developed. In the image processing apparatus, it is simple to binarize two-tone images, such as coded data images, graphic images and character images. That is, the two-tone images can be simply binarized in reference to a prescribed threshold value. Generally, the system is called a simple binarization system. However, it is rather difficult to binarize continuous-tone images, such as photograph images. Thus, many techniques or systems for binarizing the continuous-tone images, e.g., a quasi gradation system such as a dither system, have been proposed. The dither system operates to minimize a distortion of image data.

However, both the binarizations of the two-tone images and the continuous-tone images (the images will be referred to as character images and photograph images, hereafter) are mutually inconsistent. That is, a gradation of the photograph images is deteriorated when the simple binarization system is employed. On the other hand, a resolution of the character images is deteriorated when the quasi gradation system is employed. Thus, in the practical apparatus the two systems are selectively employed by a manual selection. However, either the character images or the photograph images are inevitably damaged when the character images are and the photograph images mixedly present on the same document.

To solve the problem, an Error Diffusion System has been proposed in the article "An Adaptive Algorithm for Spatial Grey Scale" in the magazine titled "Proceeding of the S.I.D.", Vol. 17/2 Second Quarter 1976, pp. 75-77. This system has made the requirements of the gradation of the photograph image and the resolution of the character image be compatible. That is, according to the Error Diffusion System binarization, errors occurring in a binarizing process of every pixel which is actually processed (the actually processed pixel will be referred to as subject pixel hereafter) are diffused on other pixels around the subject pixel after the binarization errors were each multiplied with a predetermined weighting factor.

However, a problem still exists with the Error Diffusion System when the continuous-tone images and the two-tone images are mixedly present on a same document because a resolution of the two-tone images is deteriorated.

SUMMARY OF THE INVENTION

It is, therefore, an object of the present invention to provide an image processing apparatus which is capable of satisfying the binarization of both the continuous-tone images and the two-tone images.

Another object of the present invention is to provide an image processing apparatus which is capable of promoting efficiency of the binarization processes for both the continuous-tone images and the two-tone images.

In order to achieve the above object, an image processing apparatus according to one aspect of the present invention includes an input circuit for receiving image data, a binarizing unit for binarizing a subject pixel of the image data supplied from the input circuit, an error detector for detecting an error between a binarized image data obtained by the binarizing unit and the image data supplied from the input circuit, an error diffusing circuit for diffusing the error on other image data associated with other pixels around the subject pixel, a compensating unit for compensating the image data of the subject pixel by using a compensation data which is caused by a previous error diffusion of the error diffusing circuit, a circuit for detecting an image density of the image data for a prescribed image area surrounding the subject pixel and a controller for controlling the compensating unit in response to the image density detected by the image density detecting circuit.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 1 is a diagram showing a first embodiment of the image processing apparatus according to the present invention;

DESCRIPTION OF THE PREFERRED EMBODIMENTS

Figure 4:
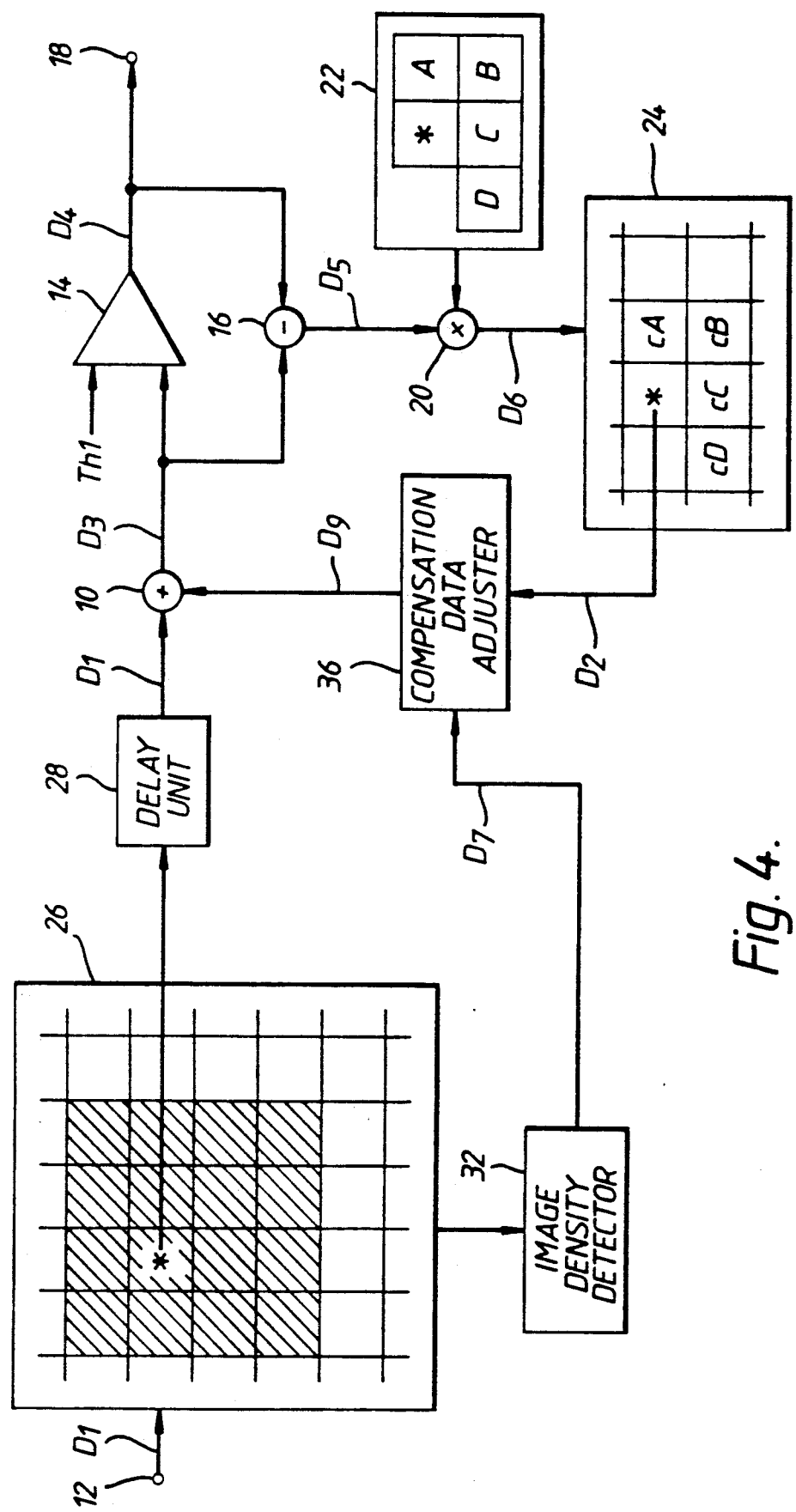
FIG. 4 is a diagram showing a second embodiment of the image processing apparatus according to the present invention.

The present invention will be described in detail with reference to the FIGS. 1 through 4. Throughout drawings, like or equivalent reference numerals or letters will be used to designate like or equivalent elements for simplicity of explanation.

Referring now to FIG. 1, a first embodiment of the image processing apparatus according to the present invention and its binarizing operation will be described in detail.

In FIG. 1, an image data D1 of the subject pixel is applied to a line buffer memory 26 through an input terminal 12. The image data D1 is read by an image reader (not shown) such as an image scanner. The line buffer memory 26 has memory areas for storing image data of pixels which are successively read. The area marked by * indicates a memory position for storing the image data of the subject pixel which is presently processed. The image data stored in the line buffer memory 26 is then applied to a compensator 10 through a delay unit 28. An operation of the delay unit 28 will be described later.

The compensator 10 compensates the image data D1 by adding the input image data D1 with a compensation data D2 which is also applied to the compensator 10. The compensation data D2 will be described later. A compensated image data D3 output from the compensator 10 is applied to a binarizing unit 14 and a binarization error detector 16. The binarizing unit 14 typically consists of a comparator to which a first threshold voltage Th1 is also applied. Thus, the binarizing unit 14 binarizes the compensated image data D3 by comparing the compensated image data D3 with the first threshold voltage Th1.

A binarized image data D4 output from the binarizing unit 14 is applied to the binarization error detector 16. The binarization error detector 16 typically consists of a subtractor. Thus, the binarization error detector 16 detects an error between the compensated image data D3 and the binarized image data D4 by subtracting the data D3 and D4 from each other. The error is output from the binarization error detector 16 as a binarization error data D5. That is, the binarization error data D5 is obtained according to the following equation:

$$D5 = D3 - D4 \quad (1)$$

This binarization error data D5 is applied to a weighting unit 20. The weighting unit 20 typically consists of a multiplier to which a weighting factor storage 22 is coupled. The weighting factor storage 22 typically consists of a ROM (Read Only Memory). Some of the areas marked by A, B, C and D in the weighting factor storage 22 indicate positional relationships between a reference position associated to the subject pixel and memory positions which store weighting factors associated for four pixels in neighbor of the subject pixel in the direction that follows the subject pixel. Here, we assume that the marks A, B, C and D represent the respective weighting factors stored in the memory positions. The four weighting factors A, B, C and D are for example, defined as $A = 7/16$, $B = 1/16$, $C = 5/16$ and $D = 3/16$.

The weighting factors A, B, C and D are applied to the weighting unit 20. The weighting unit 20 then weights the weighting factors A, B, C and D on the binarization error data D5. That is, the weighting factors A, B, C and D are individually multiplied to the binarization error data D5. Thus, the weighted error data D6 consists of the following four data elements $e_A$, $e_B$, $e_C$ and $e_D$ which are calculated by the following equations;

$$e_A = A \times D5 \quad (2)$$

$$e_B = B \times D5 \quad (3)$$

$$e_C = C \times D5 \quad (4)$$

$$e_D = D \times D5 \quad (5)$$

Alternatively, these four elements can be obtained by a following method. That is, any one of four elements, e.g., the $e_D$ can be obtained by subtraction as follows, based on other three elements, i.e., the $e_A$, $e_B$ and $e_C$ and $e_D$ after the three elements were obtained according to the equations (2), (3) and (4):

$$e_D = D5 - (e_A + e_B + e_C) \quad (6)$$

A weighted error data D6 consisting of four elements $e_A$, $e_B$, $e_C$ and $e_D$ is output from the weighting unit 20.

The weighted error data D6 is applied to a compensation data storage 24.

The compensation data storage 24 typically consists of an accumulator (not shown) and a RAM (Random Access Memory). The compensation data storage 24 has areas for storing the compensation data D2, as described above. Some of the areas marked by *, $c_A$, $c_B$, $c_C$ and $c_D$ indicate memory positions which store compensation data associated for the subject pixel and its four neighbors in pixels which follow the subject pixel. Here, we assume that the marks *, $c_A$, $c_B$, $c_C$ and $c_D$ represent data stored in the memory positions.

When the weighted error data D6 is applied to the compensation data storage 24, the accumulator accumulates the four elements $e_A$, $e_B$, $e_C$ and $e_D$ on the data $c_A$, $c_B$, $c_C$ and $c_D$. The accumulated data are again stored in the weighted error data D6. Thus, the previously stored data $c_A$, $c_B$, $c_C$ and $c_D$ are updated to the accumulated data every time that the weighted error data D6 is applied, according to the following equations;

$$c_A = c_A + e_A \quad (7)$$

$$c_B = c_B + e_B \quad (8)$$

$$c_C = c_C + e_C \quad (9)$$

$$c_D = c_D + e_D \quad (10)$$

These accumulations of the weighted error data D6 are repeated for every subject pixel. Thus the data * stored in the memory position associated to the subject pixel takes a resulted data of continuous accumulations carried out for four previously processed pixels. In other words, the data * in the compensation data storage 24 is reflected by binarizing errors of the four previously processed pixels.

The data * in the compensation data storage 24 is read as the above-mentioned compensation data D2 and then applied to a gate 30 which will be described in detail later.

On the other hand, the line buffer memory 26 is coupled to an image density detector 32. The image density detector 32 detects an image density at a prescribed image area surrounding the subject pixel *, e.g., the image area consisting of "4×4" pixels as shown by oblique line zone in the line buffer memory 26. An image density data D7 detected by the image density detector 32 is applied to a comparator 34. The comparator 34 compares the image density data D7 with a second threshold voltage Th2. Generally the image density data D7 is a relatively large value when continuous-tone images such as photograph images are processed. On the other hand, the image density data D7 is a relatively small value when two-tone images such as character images are processed.

The comparator 34 then outputs a discrimination data D8 which changes between "1" and "0", in response to the process of photograph images or character images. The discrimination data D8 output from the comparator 34 is applied to the control terminal of the gate 30. When the discrimination data D8 is "1" thus discriminating photograph images, the gate 30 allows the compensation data D2 to pass through. Then, the compensation data D2 from the compensation data storage 24 is applied to the compensator 10. On the other hand, when the discrimination data D8 is "0" thus discriminating character images, the gate 30 prohibits the compensation data D2 to pass through.

Accordingly, the compensation data D2 is selectively applied to the compensator 10 in response to whether the continuous-tone images such as photograph images are processed or the two-tone images such as the character images are processed. The discrimination is automatically carried out.

The above-mentioned delay unit 28 delays the image data D1 for a prescribed period. Thus, the image data D1 is applied to the compensator 10 synchronous with the compensation data D2 which is also applied to the compensator 10 through the gate 30.

Thus, the resolution of the character images from the deterioration due to the compensation data D2 is prevented.

Figure 2:
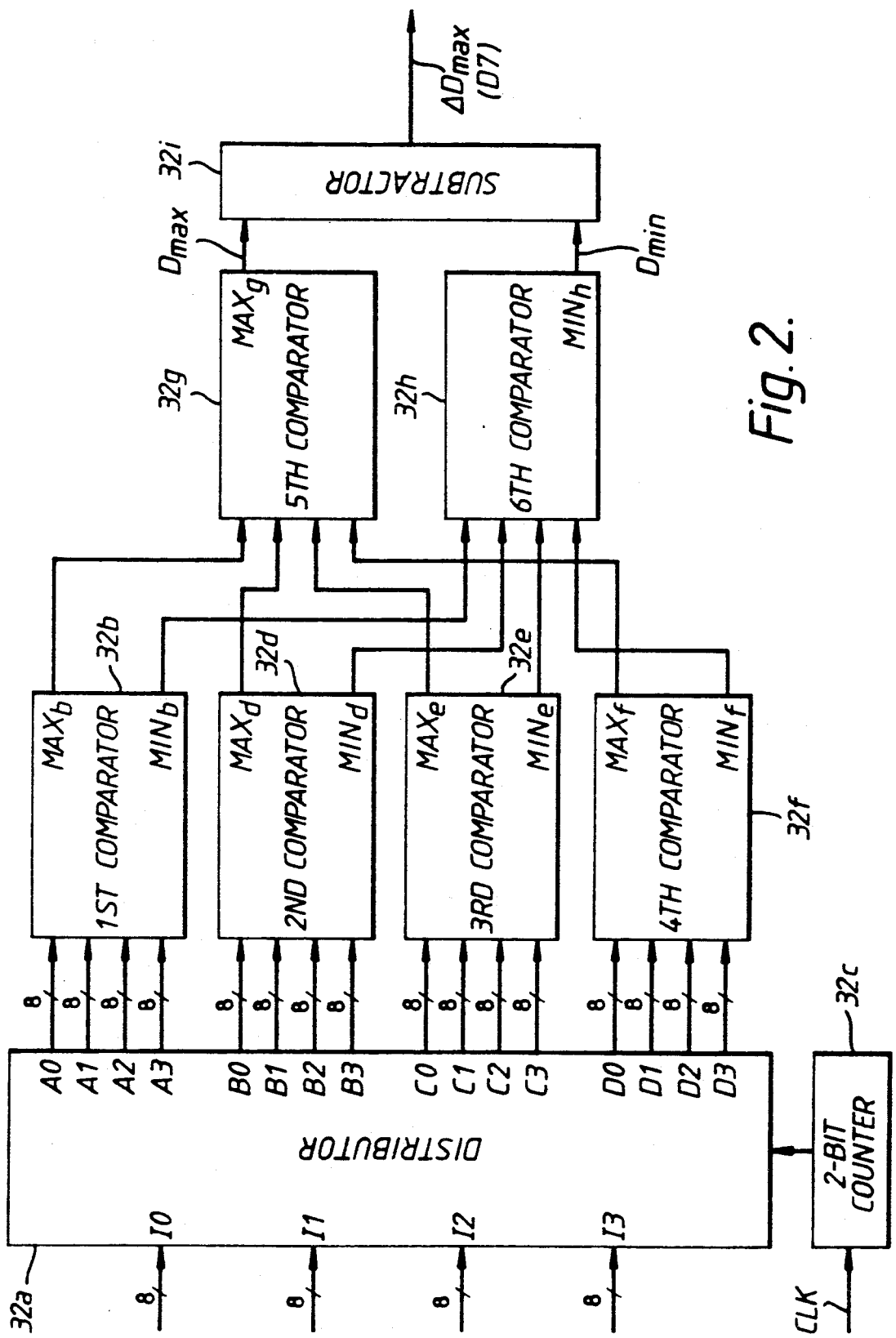
FIG. 2 is a block diagram showing the pixel density calculator in FIG. 1.
Figure 3:
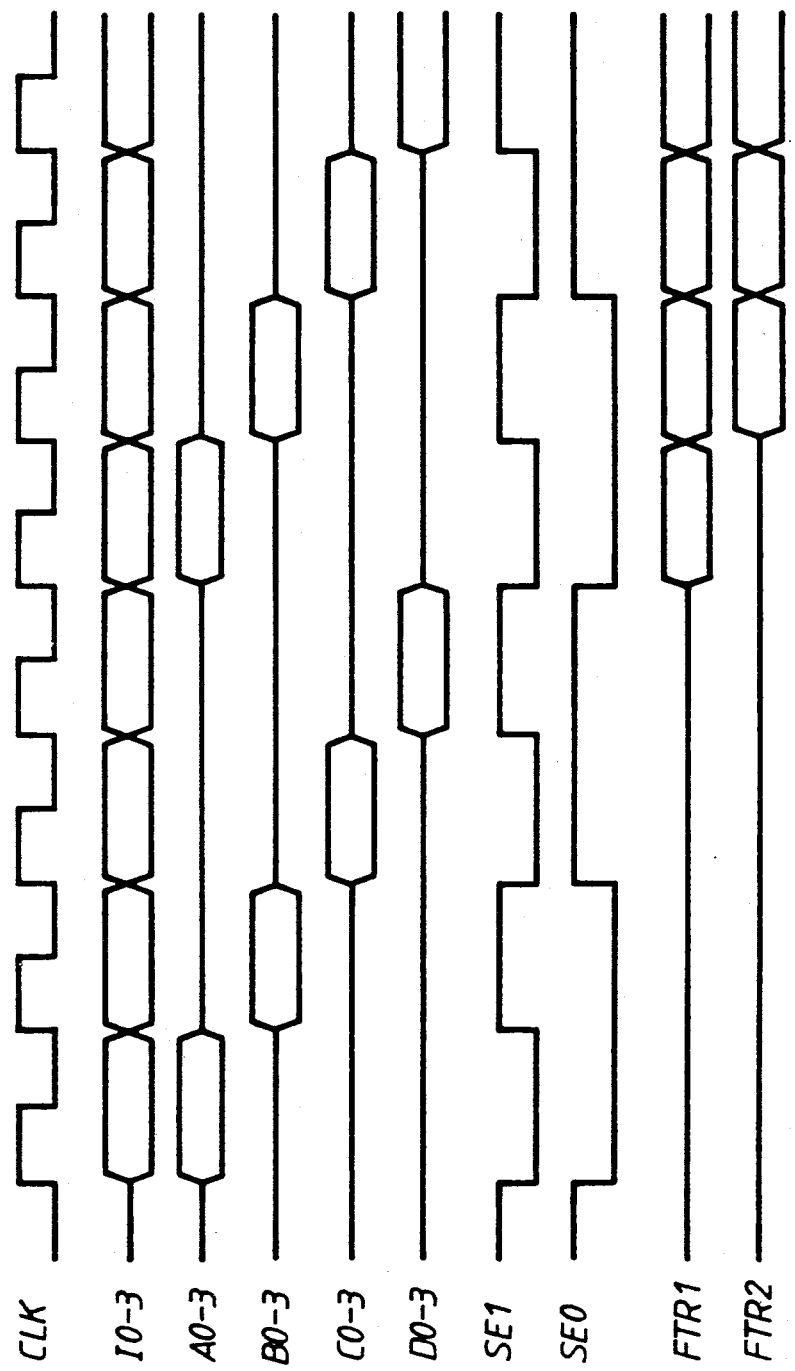
FIG. 3 is a timing chart showing the operation of a pixel density calculator of FIG. 2.
Figure 4:
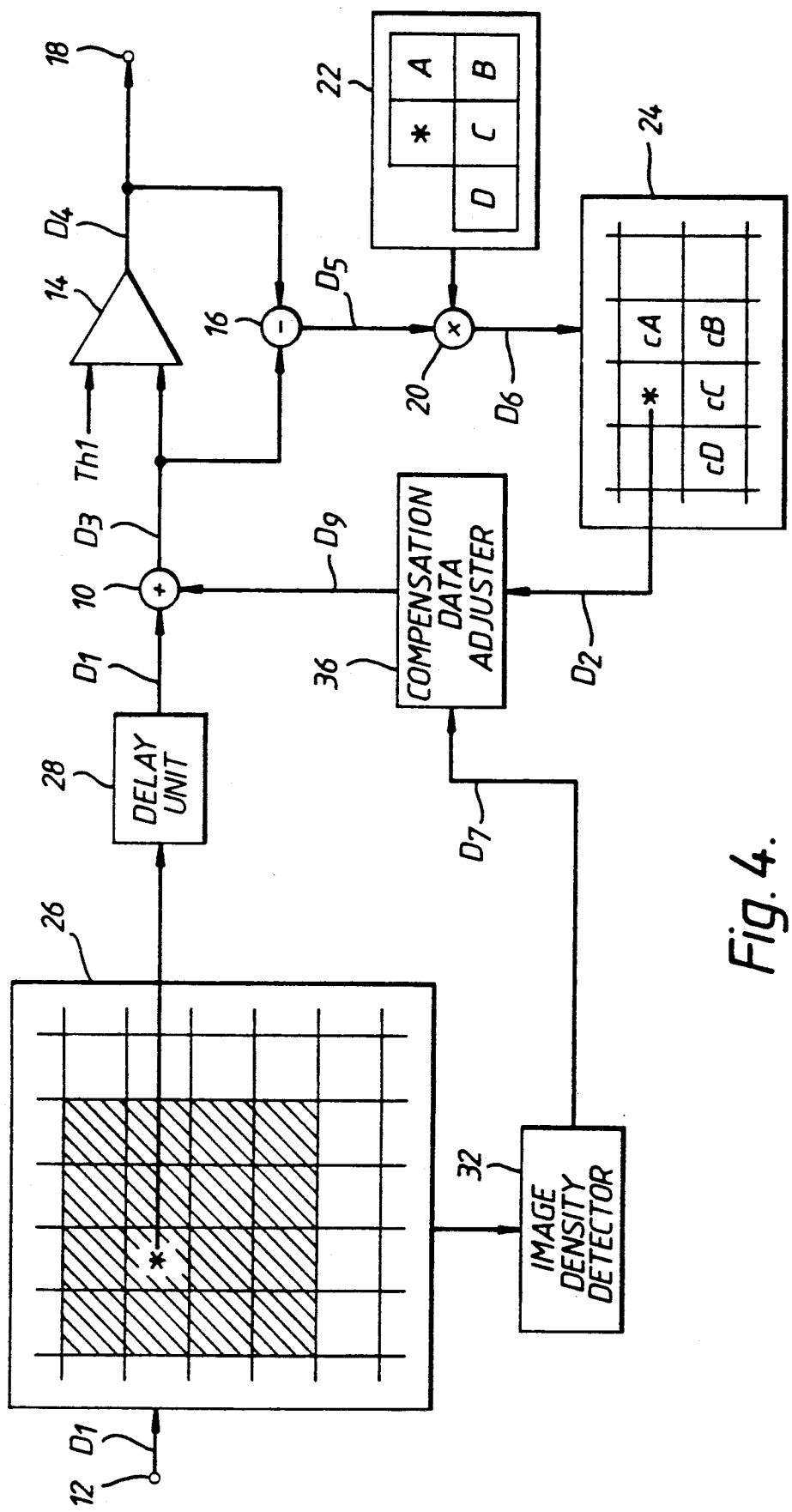

Referring now to FIGS. 2 and 3, an example of the image density detector 32 will be described in detail. FIG. 2 shows the detail of the image density detector 32. FIG. 3 shows a timing chart for explaining the operation of the image density detector 32. This example of the image density detector 32 obtains the above-mentioned discrimination data D8 by detecting pixels with maximum and minimum values within a prescribed image area surrounding the subject pixel *, e.g., the image area consisting of "4×4" pixels (see FIG. 1).

In FIG. 2, all the image data stored in the line buffer memory 26 in association with the image area consisting of "4×4" pixels are consecutively applied to a distributor 32a synchronous with a clock signal CLK (see FIG. 3). We assume that each image data has a bit size of 8 bit/pixel.

First, a set of four image data associated with four pixels along the row direction, e.g., four image data associated with the pixels along the first row of the "4×4" matrix (see FIG. 1) are applied to the distributor 32a through its first input terminal I0. The distributor 32a distributes the first set of the image data to a first comparator 32b through its output terminals A0, A1, A2 and A3. The distributing operation of the distributor 32a is managed by two control signals SE1 and SE2. These two control signals SE1 and SE2 are generated from the clock signal CLK by a 2-bit counter 32c.

The first set of the four image data along the row direction are compared with each other in the first comparator 32b. Thus, the first comparator 32b outputs the maximum value and the minimum value in the first set of the four image data through its output terminals MAXb and MINb, respectively.

Similarly, second, third and fourth sets of four image data which are associated with the pixels along the second, third and fourth rows of the "4×4" matrix are applied to the distributor 32a through its second, third and fourth input terminals I1, I2 and I3. These three sets of image data are consecutively distributed to second, third and fourth comparators 32d, 32e and 32f following the first set of the image data, respectively. Each of the comparators 32d, 32e and 32f also outputs the maximum value and the minimum value in the second, third or fourth set of the four image data.

All of the maximum values output from the first through fourth comparators 32b, 32d, 32e and 32f are applied to a fifth comparator 32g at the timing of FTR1 (see FIG. 3). Thus, the fifth comparator 32g outputs the maximum value in the maximum values applied thereto through its output terminal MAXg. On the other hand, all of the minimum values output from the first through fourth comparators 32b, 32d, 32e and 32f are applied to a sixth comparator 32h at the timing of FTR1 (see FIG. 3). Thus, the sixth comparator 32h outputs the minimum value in the minimum values applied thereto through its output terminal MINh.

The maximum value and the minimum value output from the fifth and sixth comparators 32g and 32h represent the maximum density Dmax and the minimum density Dmin of the image in the "4×4" matrix. The maximum value Dmax and the minimum value Dmin output from the fifth and sixth comparators 32g and 32h are applied to a subtractor 32i.

The subtractor 32i subtracts the minimum density Dmin from the maximum density Dmax. Thus, the difference between the maximum value Dmax and the minimum value Dmin, which represents the maximum density difference $\Delta Dmax$ of the image in the "4×4" matrix is obtained by the subtractor 32i, according to the following equation:

$$\Delta Dmax = Dmax - Dmin \qquad (11)$$

The maximum density difference $\Delta Dmax$ is applied to the comparator 34 as the above-mentioned image density data D7 (see FIG. 1).

According to the first embodiment of the image processing apparatus of the present invention, it is possible to binarize only the continuous-tone images such as the photograph images by automatically responding to the continuous-tone images. Accordingly, it is prevented that the deterioration of the resolution of two-tone images such as character images due to the two-tone images being evenly binarized is prevented. Thus, even if the continuous-tone images and the two-tone images are mixedly presented on a same document it is possible to suitably process the different types of images in response to the image density of the images.

In the first embodiment, various data such as the image data D1 through D6 are provided for processing for every pixel. However, the data can be provided for processing an image ranging in the matrix of "N×N" pixels (N represents an integer more than 2). According to this modification, the image processing speed can be increased.

Further, although the maximum density difference $\Delta Dmax$ is used to distinguish the continuous-tone images and the two-tone images in the above embodiment, special pixel density data which has a different nature for a photograph part and a character part, such as a standardized maximum density difference, that is, a value obtained by dividing maximum density difference with a mean density or Laplacian value which is a secondary differential value of image, may be used.

Referring now to FIG. 4, a second embodiment of the image processing apparatus according to the present invention will be described. This embodiment of the image processing apparatus has a construction almost the same as the first embodiment except that the gate 30 in the first embodiment is replaced by a compensation data adjuster 36. Thus, then the image density detector 32 is directly coupled to the compensation data adjuster 36 without passing through a comparator 34.

Accordingly, in regard to the second embodiment the compensation data adjuster 36 and its related portions will be described herein-below but other portions the same as those of the first embodiment will be omitted.

In FIG. 4, the compensation data adjuster 36 receives the compensation data D2 from the compensation data storage 24. Further, the compensation data adjuster 36 receives the image density data D7 from the image density detector 32. The compensation data adjuster 36 adjusts the compensation data D2 according to the image density data D7 from the image density detector 32. Thus, an adjusted compensation data D9 is applied from the compensation data adjuster 36 to the compensator 10. The input image data D1 from the line buffer memory 26 is compensated at the compensator 10 by the adjusted compensation data D9 and then supplied to the binarizing unit 14.

Now the calculation carried out in the compensation data adjuster 36 for obtaining the adjusted compensation data D9 will be described in detail. The compensation data adjuster 36 normalizes the image density data D7 from the image density detector 32, i.e., the maximum density difference ΔDmax. Thus, the maximum density difference ΔDmax ranges in "0" through "1". The compensation data adjuster 36 then calculates the adjusted compensation data D9 according to the following equation:

$$D9 = D2 \times (1 - (\Delta Dmax)norm) \quad (12)$$

wherein (ΔDmax)norm represents the normalized data of the maximum density difference ΔDmax.

The maximum density difference ΔDmax is large when the two-tone images such as the character images is processed. Thus, the adjusted compensation data D9 is a small value, as easily understood from the equation (12). On the other hand, the maximum density difference ΔDmax is small when the continuous-tone images such as the photograph images is processed. Thus, the adjusted compensation data D9 is a large value, as also understood from the equation (12).

In the second embodiment, the adjusted compensation data D9 is applied to the compensator 10 for compensating the input image data D1 in place of the compensation data D2. Further, the adjusted compensation data D9 is a compensation data adjusted by the normalized data of the maximum density difference ΔDmax which varies in response to the image density. Thus, the adjusted compensation data D9 can be used for processing any kind of images. That is, the adjusted compensation data D9 can compensate image data of all kinds of images including the continuous-tone images such as the photograph images and the two-tone images such as the character images.

In the second embodiment, the adjusted compensation data D9 can be obtained in accordance with the following equation in place of the equation (12):

$$D9 = D2/\Delta Dmax \quad (13)$$

Furthermore, any other calculations are possible for obtaining the adjusted compensation data D9. For example, "maximum density difference/average density" or a Laplacian value representing a second order differentiation of image data can be used in the equations (12) and (13) in place of the "ΔDmax" and "(ΔDmax)norm2.

Further, although in the above embodiments the input image data are binarized by the binarizing unit 14, it is possible to code the input image data to multilevel image data by using a coding unit with multiple threshold voltages. Then, multilevel printers which are able to print continuous-tone images can print the multilevel image data. Further, in this invention the detection of image density in the image density detector 32 is carried out by using an amount of optical reflections of image data. However, it is possible to convert the amount of optical reflections into a logarithm of its reciprocal and then use the converted data for detecting the image density. It is also possible to add human visual characteristics in the conversion.

As described above, the present invention can provide an extremely preferable image processing apparatus capable of promoting picture quality by performing the binarization of image data corresponding to its image and furthermore, promoting process efficiency in various image processes by performing processes corresponding to pixel densities.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. An image processing apparatus comprising:
   means for receiving image data;
   means for binarizing a subject pixel of the image data supplied from the receiving means;
   means for detecting an error between a binarized image data obtained by the binarizing means and the image data supplied from the receiving means;
   means for diffusing the error on other image data associated with other pixels around the subject pixel;
   means for compensating the image data of the subject pixel by using a compensation data which is caused by previous error diffusion of the diffusing means;
   means for detecting an image density of the image data for prescribed image data surrounding the subject pixel;
   means for simultaneously applying the received image data and the compensation data to the compensating means; and
   means for controlling the compensating means in response to the image density detected by the detecting means.

2. An image processing apparatus of claim 1, wherein the error diffusing means comprises:
   means for individually weighting a number of weighting factors on the error; and
   storage means for accumulating weighted errors in every previous operation of the weighting means and supplying the compensation data which is caused by the accumulation of the weighted errors.

3. An image processing apparatus of claim 2, wherein the weighting means comprises a ROM for storing the weighting factors.

4. An image processing apparatus of claim 1, wherein the image density detecting means includes means for generating a discrimination signal which turns on and off in response to a continuous-tone image and a two-tone image.

5. An image processing apparatus of claim 4, wherein the controlling means comprises a gate for selectively passing the compensation data to the compensating means in response to the discrimination signal.

6. An image processing apparatus of claim 1, wherein the controlling means comprises an adjuster for adjusting a quatity of the compensation data to be supplied to the compensation means in response to the image density detected by the image density detecting means.

7. An image processing apparatus of claim 1, wherein the image density detecting means comprises means for detecting the maximum difference of pixels at a prescribed image area surrounding the subject pixel.

8. A method of operating an image processing apparatus, comprising the steps of:
   receiving image data;
   binarizing the image data received by the receiving step in association with a subject pixel which is actually processed;
   detecting an error between a binarized image data obtained in the binarizing step and the image data;
   diffusing the error on other image data associated with other pixels around the subject pixels;
   compensating the image data of the subject pixel by using a compensation data which is caused by previous error diffusion step;
   detecting an image density of the image data for a prescribed image area surrounding the subject pixel;
   simultaneously applying the received image data and the compensation data to the compensation step; and
   controlling the compensation step of the image data in response to the image density detected by the detecting step.

9. An image processing apparatus for processing image data having character data and photograph data, comprising:
   means for receiving image data;
   means for binarizing a subject pixel of the image data supplied from the receiving means;
   first detecting means for detecting an error between a binarized image data obtained by the binarizing means and the image data supplied from the receiving means;
   means for diffusing the error on other image data associated with other pixels around the subject pixel;
   means for compensating the image data of the subject pixel by using a compensation data which is caused by previous error diffusion of the diffusing means;
   second detecting means for detecting an image density of the image data for prescribed image data surrounding the subject pixel so as to determine whether the subject pixel is the character data or the photograph data;
   means for simultaneously applying the received image data and the compensation data to the compensating means; and
   means for controlling the compensating means in response to the image density detected by the second detecting means, the controlling means having means for decreasing a quantity of the compensating data when the second detecting means determines that the subject pixel is character data and means for increasing the quantity of the compensating data when the second detecting means determines that the subject pixel is photograph data.

* * * * *

UNITED STATES PATENT AND TRADEMARK OFFICE
CERTIFICATE OF CORRECTION

PATENT NO. : 5,077,812
DATED : December 31, 1991
INVENTOR(S) : Hiroki Kanno et al It is certified that error appears in the above-identified patent and that said Letters Patent is hereby corrected as shown below:

```
Claim 6, column 9, line 8, change "quatity"
to --quantity--.
```

Signed and Sealed this

Twenty-second Day of June, 1993

Attest:

MICHAEL K. KIRK

Attesting Officer

Acting Commissioner of Patents and Trademarks